March 30, 1965 C. W. BRYAN 3,175,635
TRACTION MEANS FOR IRRIGATION PIPE TRANSPORTING DEVICE
Filed Nov. 6, 1963
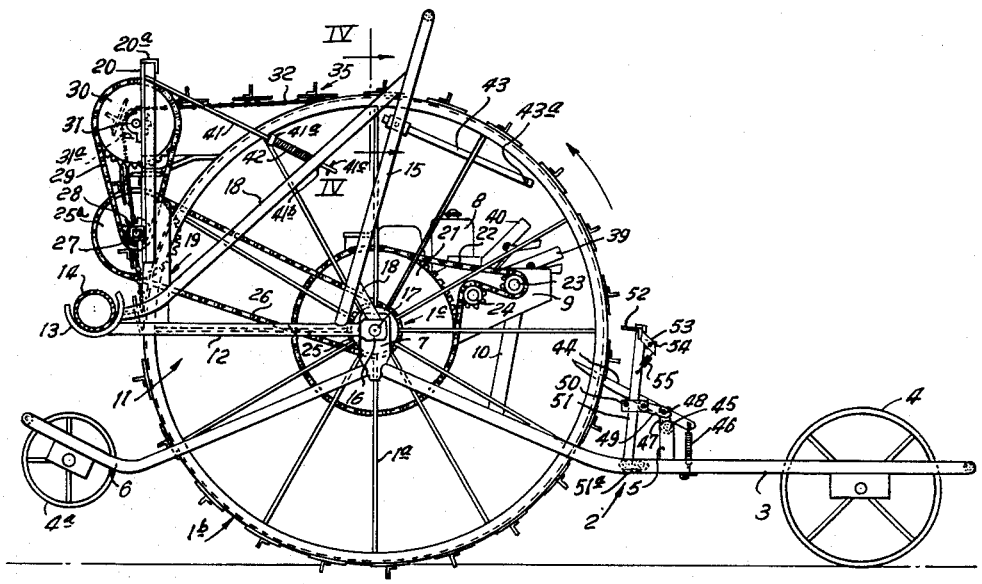
Fig. I
Fig. III
Fig. II
Fig. IV
INVENTOR
Carroll W. Bryan
BY Howard E. Moore
ATTORNEY United States Patent Office 3,175,635
Patented Mar. 30, 1965

3,175,635
TRACTION MEANS FOR IRRIGATION PIPE
TRANSPORTING DEVICE
Carroll W. Bryan, Dallas, Tex., assignor to Atlas Metal Works, Inc., Dallas, Tex., a corporation of Texas
Filed Nov. 6, 1963, Ser. No. 321,878
3 Claims. (Cl. 180—9.64)

This invention is concerned with an irrigation pipe transporting device, and is particularly concerned with an improved traction means extending about a wheel on which the power unit, transmission sprocket and chain assembly, and the pipe carrying cradle are mounted and transported.

The improved traction means comprehended by this invention is particularly usable and advantageous in a type of irrigation pipe transporting device comprised of a series of transporting wheels in substantial axial alignment disposed along a section of irrigation pipe extending across a field. Each wheel includes an axle about which it may turn on the outer end of which is pivotally mounted a frame on which is mounted a pipe cradle and power transmission sprockets and connecting chains, as will be hereinafter described.

One of the pipe transporting assemblies, as hereinbefore indicated, has mounted on the frame thereof a power unit, such as an internal combustion engine, which through appropriate drive means comprised of sprockets and chains, drives the sprocket and chain train in the transmission assembly, which in turn rotates a chain extending about the transporting wheel.

Through an appropriate drive means and an auxiliary shaft which extends to the other aligned power transmission assemblies, the chains about other wheels of other transporting units are rotated by the common power supply.

Means is provided for temporarily holding the chains extending about the pipe transporting wheels against rotation, so that when the engine is started and power is transmitted therefrom through the transmission assemblies, the pivoted frames on which the pipe cradles and transmission units are mounted are caused to move upwardly on the chain to thereby raise the pipe for transporting. Means is carried by the pivoted frame for tripping and releasing the holding means to thereby allow the chain extending about the transporting wheel to be rotated by the power transmission unit, and thereby rotate the wheel and thus transport the entire assembly with the pipe thereon, across the field.

Clutch means is provided for reversing the rotation of the sprockets in the power transmission assembly to allow the pipe to be lowered after it has been transported to the desired location.

In such device, as previously used, the traction means between the wheel and the chain drive therefor, consisted of a chain which articulated with sprocket teeth secured to the outer periphery of the wheel.

This arrangement proved to be unsatisfactory in that the chain would become stretched and slip off the sprocket teeth, or the application of localized force on the chain at the sprocket teeth adjacent the power transmission sprocket would cause the chain to break.

It is, therefore, a primary object of this invention to provide a traction means between the chain and the outer periphery of the wheel in such a device in which the force applied through the chain to the outer periphery of the wheel is evenly distributed about the wheel so that there is no tendency to stretch or break the chain, or to cause its displacement with reference to the outer periphery of the wheel.

Another object of the invention is to provide traction means between the chain and the outer periphery of the wheel which is frictionally applied about the periphery of the wheel, and is evenly distributed thereabout.

Still another object of the invention is to provide traction means between the chain and the outer periphery of the wheel which is maintained in alignment about the wheel, and which automatically cleans mud and debris from the outer surface of the wheel as the wheel rotates.

A further object of the invention is to provide a drive chain and cleat combination extending about the outer periphery of a wheel, wherein the drive chain is recessed in a channel in the outer periphery of the wheel, and the cleat includes arcuately shaped arms on each side of the channel engageable with the outer periphery of the wheel, to impart frictional force thereto to turn the wheel, and including an outwardly extending ground engaging and penetrating cleat portion to provide traction between the ground and the traction member.

Other and further objects of the invention will become apparent upon reading the detailed specification hereinafter following, and by referring to the drawing annexed hereto.

A suitable embodiment of the invention is shown in the attached drawing, wherein:

FIGURE I is a side elevational view of the master pipe transporting device with the pipe and transmission assembly in partially raised position preparatory to being transported;

FIGURE II is an enlarged perspective view of one of the special traction cleats mounted in relationship to the outer periphery of the wheel;

FIGURE III is a fragmentary, cross-sectional, elevational view of the wheel rim showing the chain, and special traction cleat carried thereby, in relationship to the channel about the outer periphery of the wheel; and FIGURE IV is a transverse, sectional view taken on the line IV—IV of FIGURE I.

Numeral reference are employed to designate the various parts shown in the drawing, and like numerals indicate like parts throughout the various figures of the drawing.

Referring first to FIGURE I, a transporting wheel 1 is made up of a relatively wide flat rim 1b, which is supported by spokes 1a secured to the inner sides of the rim as shown in FIGURE IV, and to an axle housing 1c which is rotatable about a suitable axle 17.

A fixed support or base frame, generally indicated at 2, includes a wheel supporting portion 3 and a pipe cradle supporting portion 6.

The frame portions 3 and 6 are comprised of spaced tubular or rod-like members which embrace the wheel 1 and are secured at their inner ends to brackets 7 which are secured to the axle 17 on each side of the wheel 1.

Balance wheels 4 and 4a are rotatably disposed between the spaced side members of the frame portions 3 and 6 so as to provide wheels on which the frame member is balanced and transported in the manner hereinafter described.

An upwardly extending arcuate brace member 5 is secured between the spaced side members of the frame portions 3, for the purpose of providing a brace therebetween and also for providing a mounting member for the chain brake assembly hereinafter described.

An internal combustion engine 8 is mounted on a frame 9 at one side of the wheel 1, said frame 9 being secured at its inner end to the axle 17 and its outer end is secured and mounted to one of the side members of the frame member 3 by a brace 10 extending therebetween.

A transmission and pipe support frame, generally indicated at 11, includes arms 12 extending on each side of the wheel 1, and pivotally secured about the axle 17 on each side of the wheel 1 by means of flat enlarged end portions 16 having passages therethrough which are loosely and rotatably extended about the axle 17 at the ends thereof.

The frame members 12 are secured at their outer ends to the semi-circular pipe cradles 13 which extend between the spaced side frame members 12 so as to cradle and support pipe 14 therein.

An upwardly extending frame portion 15 is secured to the pivoted frame assembly 11. The frame portion 15 is comprised of a tubular or rod-like member comprising spaced sides extending on each side of the wheel 1 and closed at its upper end, to provide a substantially U-shaped member embracing the wheel.

Angularly extending brace members 18 are secured between the spaced sides of the frame member 15 and the pipe cradle 13.

An upstanding transmission frame 19 includes spaced side frame members 20 joined at their upper ends by a transverse member 20a and secured at their lower ends to the spaced frame members 12, provides a mounting means for the sprockets, chains and shafts required for transmitting power from the engine 8 to the traction chain 32 and to other pipe transporting units aligned with the main power transporting unit herein described.

A driven sprocket 21 is secured to the axle 17, and is driven by a drive chain 22 which extends about the drive sprocket 23, which is secured to a shaft driven by the motor 8. Said drive chain 22 extends over the upper periphery of the drive sprocket 24, which also is secured to a shaft driven by the motor 8.

A smaller diameter driven sprocket 25 is secured to the shaft 17 so as to rotate with the driven sprocket 21, and drive the driven sprocket 25a through a chain 26, which extends about the sprockets 25 and 25a.

A driven shaft 27 is mounted for rotation in bearings mounted on the side frame members 20, and a driven sprocket 28 is secured to the shaft 27 for rotation therewith. The driven sprocket 25a is also secured to the shaft 27 for rotation therewith in spaced relation to the sprocket 28.

A driven sprocket 30 is secured to a driven shaft 31, which shaft 31 is mounted for rotation on bearings secured to the spaced frame members 20. The sprocket 30 is mounted in vertical alignment with sprocket 28, so that the drive chain 29 may be extended about the sprockets 28 and 30 for rotation of the driven sprockets 30 through the driven sprocket 28.

A driven sprocket 31a is secured to the shaft 31 in spaced relationship to the sprocket 30 and has teeth thereon which articulate with the links of the traction chain 32.

The outer periphery of the wheel 1 has a channel 33 extending medially thereabout which is bordered on either side by arcuate flat surfaces 34.

The traction chain 32 is recessed in the channel 33.

A plurality of spaced traction members, generally indicated at 35, are secured to the outer side of the chain 32 in spaced relationship thereabout.

Each traction member 35 is comprised of a transverse outwardly extending flat cleat 36, arcuately shaped legs 37 which are secured in right angular relationship to the cleat 36, and are shaped to contact and conform to the surface curvature of the peripheral surfaces 34 of the wheel 1, and on attachment extension 38 made integral with cleat 36 and secured to the outer surface of the drive chain 32.

Thus, as shown in FIGURE II, when the chain 32 is disposed in the channel 33, the arcuate legs 37 extend right angularly outwardly on each side of the cleat 36 substantially equal distances and conform to and contact the surfaces 34 on the outer periphery of the wheel 1.

It will be noted in FIGURE III, that the chain 32 does not contact the bottom of the channel 33, so that the legs 37 of the traction member 35 are in frictional contact with the surfaces 34 about the outer periphery of the wheel 1, to thereby provide traction between the chain 32 and the wheel 1 to rotate the wheel through the chain 32.

Clutch control levers 39 and 40 are provided for engaging the shafts 23 and 24 with the motor 8. The clutch control lever 39 engages the clutch between the motor 8 and the shaft 23, to provide forward rotation of the driven gear 23 and through the gear and chain drive system to raise the pipe cradle and transmission frame 11 and 20 or rotate the wheel 1 forwardly in the direction indicated by the arrow depending on whether the brake is engaged with the chain 32.

Clutch control lever 40 is provided for engaging the clutch between the motor 8 and the shaft 24 after the forward clutch controlled by the lever 39 is released, to thereby provide reverse rotation of the driven sprocket 21 to thereby rotate the wheel 1 in reverse direction opposite to the direction of the arrow indicated in FIGURE I.

Rods 41 are secured at their inner ends to the spaced frame members 20 and extend through springs 42 which are abutted between spaced stops on the rods and on the braces 18. The outer stop 41a is secured to the shaft 31 and the spring 42 is abutted between such outer stop and a stop 41b secured to the brace 18. The outer end of the shaft 41 slidably extends through the stop 41b secured to the brace 18 and is secured against escape therefrom by a key or nut 41c. The rod and spring assemblies just described provide a cushioning effect for the lateral movement of the frame members 20, and yet support same.

A trip arm 43, having a laterally extending portion 43a secured thereto, is attached to the upwardly extending bracket frame member 15.

A lower trip arm 44 is pivotally secured to a bracket 45 secured to the brace 5 on frame member 3. A spring 46 is attached between the outer end of arm 44 and the frame 3 so as to urge the outer end of the arm downwardly. The arm 44 is pivotally attached to a bracket 47 by pivot pin 48. Pivot pin 48 is also secured to link 49 which is pivotally attached to a bracket 50 clamped to the upstanding brake lever 51. An inwardly extending brake leg 52 is secured to an arm 53 which is pivotally attached to a lug 54 extending outwardly from the brake lever 51. The arm 53 is urged upwardly by spring 55 attached between the outer end thereof and the lever 51. Leg 52 engages lever 51 to limit outward movement thereof but is free to move inward against spring 55.

When arm 43 engages arm 44, brake lever 51 will be pulled rearwardly through link 49, lever 51 pivoting about pivot point 51a.

Normally the laterally extending leg 52 engages one of the cleats 36, to hold the chain 32 against rotation, but when the frame member 15 swings over in the manner hereinafter described, the arm 43 engages the outer end of the arm 44a and through the link 49 pulls the lever 51 outwardly and leg 52 out of engagement with the cleats 36. This frees the chain 32 for rotation in the manner which will be hereinafter described.

The operation and function of the pipe transporting device hereinbefore described is as follows:

Initially the frame 11 is in down position so that the cradle 13 rests upon the outwardly extending portion 6 of the frame 2, and the arm 51 is in inward position, with the laterally extending leg 52 in engagement with one of the cleats 36 on the chain 32. The engine 8 is started, and the clutch lever 39 is actuated to engage the engine 8 with the forward sprocket 23, which rotates the sprocket 31a through the sprocket and chain train hereinbefore described. Inasmuch as the chain 32 is held against rotation by the leg 52a engaging a cleat 36 of the chain, the gear 31a will move upwardly with reference to the chain 32 carrying with it the frame 19 and the pivoted frame 11. This movement continues until the laterally extending portion 43a of trip arm 43 engages the outer end of the arm 44 depressing the same, rotating arm 49 downwardly, and thereby pulling backwardly on the lever 51. This releases the leg 52 from engagement with the cleat 36, thereby allowing the chain 32 to be rotated by the sprocket 31a. By reason of frictional contact between the legs 37 of the traction member 35 with the outer surface of the wheel 1, the wheel 1 is rotated in the direction indicated by the arrow in FIGURE I, thereby moving the entire pipe moving device across the ground as the cleats 36 successively penetrate the ground to provide traction therewith.

Through shaft 27, which is connected between the pipe transporting assemblies in alignment with the master assembly disclosed herein, other assemblies are moved, thereby transporting a length of pipe extending across a field or other given area.

When the pipe has been moved to the place desired, the clutch between the engine 8 and the shaft 23 is disengaged by movement of the lever 39 and the clutch between the engine 8 and the shaft for reverse sprocket 24 is engaged, to thereby rotate the sprocket 24 in the same direction as shaft 23 is rotated but due to the fact that the chain 22 is extended over the upper periphery of the sprocket 24, the sprocket 21 is rotated in reverse direction, thereby rotating the sprocket 31a in reverse direction from the initial rotation to cause the chain 32 to rotate the wheel 1 in reverse direction to the initial rotation. As the chain 32 rotates in reverse direction, the cleats 36 will rotate leg 52 downwardly against spring 55 and thereby go past same.

The frame 11 may be lowered until the cradle 13 comes to rest upon the outwardly extending portion 6 of the frame 2 by engaging the chain 32 by a stop member (not shown) carried by the frame to hold the chain against rotation while the sprocket and chain train are reversely rotated as described above.

It will be noted that the legs 37 of the traction member 35 brace and support the chain 32 on each side of the cleat 36, and there is no tendency for the chain to be stretched or buckled when the cleat 36 engages the ground. The legs 37 brace same against such action. Furthermore, frictional contact between the legs 37 and the outer periphery of the wheel is distributed about the wheel by the arcuately shaped arms 37.

Moreover, the chains 32 are recessed in the channel 33 and as the chain progressively moves outwardly of the channel as the chain and wheel rotate, the chain expels dirt, mud and other debris which has a tendency to collect on the outer surface of the wheel. Thus the device is self-cleaning.

Thus an improved traction device is provided for a pipe moving device of the type described, wherein there is no tendency for the drive chain to slip about the wheel or to become disengaged therefrom, and there is no unusual strain placed upon isolated areas of the chain which could cause same to break.

It will be understood that other and further embodiments of the invention may be devised without departing from the spirit and scope of the appended claims.

Having described my invention, I claim:

1. In a device of the class described, a frame; a wheel rotatably mounted on the frame; a channel extending centrally about the outer periphery of the wheel; curved, unbroken surfaces on each side of the channel; a drive member disposed in the channel about said wheel; a plurality of traction members attached to the drive member, each traction member having a transversely disposed cleat with a pair of curved legs on each side thereof contacting the surfaces of the wheel on each side of the channel, said legs being shaped to conform to the curvature of the curved, unbroken surfaces on the outer periphery of the wheel on each side of the channel; the drive member being spaced from the bottom of the channel by engagement of the arms with the curved surfaces on the outer periphery of the wheel; and means to rotate said drive member to thereby rotate the wheel solely by frictional contact between the arms and the curved surfaces on the outer periphery of the wheel.

2. The combination called for in claim 1 wherein the drive member is a chain and the means to rotate the drive member is a driven sprocket in engagement with the chain.

3. The combination called for in claim 2 with the addition of means to hold the drive member against rotation to cause the sprocket to move about the periphery of the wheel on the chain.

References Cited by the Examiner
UNITED STATES PATENTS

| 595,051 | 12/97 | Elieson | 74—229 |
| 2,465,567 | 3/49 | Atwood | 180—9.22 X |
| 3,093,423 | 6/63 | Adams | 305—56 |

FOREIGN PATENTS 103,801  2/17  Great Britain.

ARTHUR L. LA POINT, *Primary Examiner.*